(12) United States Patent
Fang et al.

(10) Patent No.: US 11,924,178 B2
(45) Date of Patent: Mar. 5, 2024

(54) METHOD AND SYSTEM FOR SECURE INFORMATION DISTRIBUTION BASED ON GROUP SHARED KEY

(71) Applicant: MAXIO Technology (Hangzhou) Co., Ltd., Hangzhou (CN)

(72) Inventors: Gang Fang, Hangzhou (CN); Wei Xu, Hangzhou (CN); Yan Cai, Hangzhou (CN); Jun Chen, Hangzhou (CN); Zhehang Wen, Hangzhou (CN); Li Liang, Hangzhou (CN); Guohua Chen, Hangzhou (CN); Yiming Lu, Hangzhou (CN)

(73) Assignee: MAXIO Technology (Hangzhou) Co., Ltd., Hangzhou (CN)

( * ) Notice: Subject to any disclaimer, the term of this patent is extended or adjusted under 35 U.S.C. 154(b) by 287 days.

(21) Appl. No.: 17/549,695

(22) Filed: Dec. 13, 2021

(65) Prior Publication Data
US 2022/0191178 A1 Jun. 16, 2022

(30) Foreign Application Priority Data
Dec. 14, 2020 (CN) .......................... 202011469818.X

(51) Int. Cl.
*H04L 9/40* (2022.01)
*H04L 9/08* (2006.01)

(52) U.S. Cl.
CPC .......... *H04L 63/0435* (2013.01); *H04L 9/085* (2013.01); *H04L 9/0866* (2013.01)

(58) Field of Classification Search
None
See application file for complete search history.

(56) References Cited

U.S. PATENT DOCUMENTS

| | | | |
|---|---|---|---|
| 8,848,921 B2 * | 9/2014 | Tang | H04L 9/0833 380/279 |
| 2010/0208895 A1 * | 8/2010 | Boneh | H04L 9/3073 380/278 |
| 2012/0254616 A1 * | 10/2012 | Brown | H04L 63/0823 713/171 |
| 2018/0270060 A1 * | 9/2018 | Gray | H04L 63/06 |
| 2021/0026826 A1 * | 1/2021 | Gwangsun | G06F 16/9014 |

* cited by examiner

*Primary Examiner* — Trang T Doan
(74) *Attorney, Agent, or Firm* — Westman, Champlin & Koehler, P.A.

(57) ABSTRACT

Disclosed is a system and a method for information distribution. The system comprises: a server for generating a group key and its corresponding key deriving parameter, wherein the server encrypts sensitive contents by using the group key to obtain encrypted information; and terminals configured to receive the encrypted information through an open channel, extract the group key, then decrypt the encrypted information by using the group key to obtain the original content. In the group forming process, each terminal encrypts its private identifier using the public key and submits the ciphertext to the server. In information distribution process, the server transmits the ciphertext of sensitive contents and the key deriving parameter to the terminals via open channel Because private information available only to respective group members is required for calculating the group key, this mechanism ensures that the sensitive content can be transmitted securely on the open channel.

20 Claims, 3 Drawing Sheets

---→ Secure Channel
- - - -→ Open Channel, Broadcast: {[M], A, r}

Vi, SNi:User's Private information
[M]: Distribution Package of Ciphertext of Sensitive Information
A, r: Public Information for Solving Group Shared Key

METHOD AND SYSTEM FOR SECURE INFORMATION DISTRIBUTION BASED ON GROUP SHARED KEY

CROSS-REFERENCE TO RELATED APPLICATION(S)

This application claims priority to Chinese Application No. 202011469818.X, filed on Dec. 14, 2020, entitled "METHOD AND SYSTEM FOR INFORMATION DISTRIBUTION BASED ON GROUP SHARED KEY", published as CN112583590A on Mar. 30, 2021, the contents of which are incorporated herein by reference in their entireties.

FIELD OF THE DISCLOSURE

The present disclosure relates to a technical field of network communication, more specifically, to a method and a system for secure information distribution based on a group shared key.

DESCRIPTION OF THE RELATED ART

With rapid development of network technology, more and more important information has been transmitted through the network, and people pay more and more attention to information security. Information is usually required to be encrypted when private communication is conducted through the Internet, and the generation and management of encryption keys is the key factor with respect to secure communication. According to different arrangement of transmit and receiving parties, Internet communication can be divided into three types of situations: one-to-one communication, one-to-many communication, and many-to-many communication. Different security schemes are used for the above situations.

In the case of one-to-many (1:N) communication, broadcast information is distributed from a central information server to a plurality of information receivers. Based on a communication mechanism, the central information server negotiates a key with each information receiver, generates a distribution information package for each target information receiver, and encrypts and signs sensitive content with a specific key belonging to that target information receiver. When the number N of receivers becomes very large, this communication mechanism is inefficient and inconvenient to be managed. Based on another communication mechanism, the central information server releases information to members of designated groups, and each one of the group members somehow authenticates its identity of being a group member, wherein the identity is going to be used for obtaining a ciphertext information package released to the group from the central information server and a corresponding key for decrypting the information package. Since only one ciphertext distribution information package and one key are generated for the entire group, the communication mechanism can significantly improve efficiency when the number N of receivers becomes large.

A group key management method based on linear geometric transformation is disclosed in U.S. Pat. No. 8,848,921B2. As shown in FIG. 1, in the communication system 10, a single server 11 distributes sensitive content to a plurality of node devices 12, so as to realize one-to-many (1:N) communication. Before a secure channel for transmitting sensitive content is established, all node devices 12 (U1, U2, ..., Un) receiving the sensitive content generate their respective private identification information (V1, V2, ..., Vn) which is respectively transmitted to the distribution server 11, which is a server or a group controller, via reverse secure channels. Collectively, these private identification information form the target group (V={V1, V2, ..., Vn}). In accordance with the number of group members, the server 11 generates member serial numbers (SN1, SN2, ..., SNn), which are transmitted to the node devices 12 serving as group member's serial number, through a forward secure channel. The serial numbers are also required to be protected as private information.

In the above-described communication system according to the prior art, the communication mechanism between the server 11 and the node devices 12 includes exchanging sensitive private information via a bidirectional secure channel in order to establish a secure channel over an open channel for subsequent secure information delivery. However, in some practical application environments, it is not always possible to provide a bidirectional secure channel in advance. In the above-mentioned patent and similar information distribution solutions, before a secure channel for sensitive content is established, the node devices are required to submit private information via the reverse secure channel, and to receive member serial numbers assigned by the server via the forward secure channel, thus limiting the application range of the communication mechanism.

SUMMARY OF THE DISCLOSURE

In view of the above-mentioned problems, an objective of the present disclosure is to provide a method and a system for information distribution based on a group shared key, wherein each of a plurality of terminals is configured to submit a private identifier encrypted by a public key to a server, and the server is configured to transmit encrypted information and a set of key-deriving parameters (KDPs) to the plurality of terminals through open channels, thereby eliminating the needs for bidirectional secure channel.

According to a first aspect of the present disclosure, a system for secure information distribution is provided, and comprises: a server for generating a key pair which is required by a public key cryptographic algorithm and includes a public key and a private key, generating a group shared key and a key deriving parameter corresponding to the group shared key, wherein the server is configured to encrypt a sensitive content by use of the group shared key to obtain an encrypted information; and a plurality of terminals, configured to receive the encrypted information broadcasted by the server through an open channel, and to decrypt the encrypted information by use of the group shared key to obtain the sensitive content, wherein, each of the plurality of terminals is configured to encrypt its private identifier which is global unique by use of the public key to generate a ciphertext of the corresponding private identifier. The server generates the key deriving parameter by executing following steps: collecting the ciphertexts of the private identifiers from the plurality of terminals and decrypting the ciphertexts of the private identifiers with the private key of the server; constructing a group according to the private identifiers submitted by the plurality of terminals; and calculating the key deriving parameter according to the group shared key, an additional parameter and the private identifiers of the plurality of terminals. Each one of the plurality of terminals obtain the group shared key by executing a following step: performing an inverse operation in accordance with the key deriving parameter, the additional parameter and the corresponding private identifier to obtain the group shared key.

Preferably, the plurality of terminals each obtain the public key from the server in any manner.

Preferably, the plurality of terminals each submit the ciphertext of the corresponding private identifier to the server in any manner.

Preferably, the server is configured to provide the key deriving parameter to the plurality of terminals in any manner.

Preferably, the server is configured to transmit the encrypted information to the plurality of terminals through the open channel or a secure channel.

Preferably, the public key is embedded in the plurality of terminals.

Preferably, the plurality of terminals each comprise: an upstream device coupled with the server through the open channel; and a target device communicating with the upstream device via a secure channel, wherein the private identifier of the target device serves as an identification information of the corresponding terminal, wherein the target device is configured to execute the inverse operation to solve the shared key out.

Preferably, the upstream device is a module controller of a production line, and the target device is a functional module used in production.

Preferably, the upstream device is a user computer, and the target device is an embedded functional module.

Preferably, the embedded functional module comprises a processor for processing the sensitive content.

Preferably, the embedded functional module comprises any one of a solid-state disk, a camera module, a display driving chip and a touch driving chip.

Preferably, the embedded functional module comprises a master chip, and the private identifier serving as the identification information of the corresponding terminal is generated and stored in the master chip.

Preferably, the sensitive content comprises any one of a software, firmware, a webpage content, a data interaction information.

Preferably, after calculating the key deriving parameter, the server is further configured to executed following steps: establishing a Hash table which has a capacity larger than a capacity required for storing the key deriving parameter of the plurality of terminals; storing a plurality of key-value pairs in the Hash table, wherein keywords in the plurality of key-value pairs respectively correspond to indexes of the key deriving parameter, and values in the plurality of key-value pairs respectively correspond to elements of the key deriving parameter; and filling an unoccupied element in the Hash table with a random number.

Preferably, the indexes are computed based on the private identifiers of the plurality of terminals.

Preferably, the server is configured to transmit the Hash table to the plurality of terminals as a carrier of the key deriving parameter.

According to a second aspect of the present disclosure, a method for information distribution is provided, and comprises: executing following steps on a server: generating a key pair which includes a public key and a private key and is required by a public key cryptographic algorithm; collecting private identifiers of a plurality of terminals; constructing a group according to the private identifiers submitted by the plurality of terminals; generating a group shared key; calculating key deriving parameter according to the group shared key, an additional parameter and the private identifiers of the plurality of terminals; encrypting a sensitive content by use of the group shared key to obtain an encrypted information; packaging the encryption information, the key deriving parameter and the additional parameter together into a package and distributing the package. Further, the method comprises: executing following steps on each one of a plurality of terminals: encrypting the private identifier which is globally unique and associated with a corresponding one of the plurality of terminals by use of the public key to generate a ciphertext of the private identifier; receiving the encrypted information and the key deriving parameter distributed by the server via an open channel; performing an inverse operation according to the key deriving parameter, the additional parameter and the private identifier associated with the corresponding terminal to obtain the group shared key; and decrypting the encrypted information by use of the group shared key to obtain the sensitive content.

Preferably, the plurality of terminals each obtain the public key from the server in any manner.

Preferably, the plurality of terminals each submit the ciphertext of the corresponding private identifier to the server in any manner.

Preferably, the server is configured to provide the key deriving parameter to the plurality of terminals in any manner.

Preferably, the server is configured to transmit the encrypted information to the plurality of terminals via an open channel or a secure channel.

Preferably, the public key is embedded in the plurality of terminals.

Preferably, the plurality of terminals each comprise: an upstream device coupled with the server via an open channel; and a target device communicating with the upstream device via a secure channel, wherein the globally unique private identifier of the target device serves as the identification information of the corresponding terminal, wherein the target device is configured to execute the inverse operation of decrypting the shared key.

Preferably, the upstream device is a module controller of production line, and the target device is a functional module used in production.

Preferably, the upstream device is a user computer, and the target device is an embedded functional module.

Preferably, the sensitive content comprises any one of a software, a firmware, a webpage content, a data interaction information.

Preferably, after calculating the key deriving parameter, the server is further configured to execute following steps: establishing a Hash table which has a capacity larger than a capacity required for storing the key deriving parameter of the plurality of terminals; storing a plurality of key-value pairs in the Hash table, wherein key words in the plurality of key-value pairs respectively correspond to indexes of the key deriving parameter, and values in the plurality of key-value pairs respectively correspond to elements of the key deriving parameter; and filling an unoccupied element in the Hash table with a random number.

Preferably, the indexes are computed based on the private identifiers of the plurality of terminals.

Preferably, the server is configured to transmit the Hash table to the plurality of terminals as a carrier of the key deriving parameter.

According to the system and the method for information distribution provided by embodiments of the present disclosure, a terminal is configured to submit a ciphertext form of the private identifier encrypted by use of the public key to a server, the server is configured to transmit the encrypted information and the KDPs corresponding to the shared key to the terminal, and the terminal is configured to perform the inverse operation according to the KDPs and the corresponding private identifier to obtain the group key. In the process of information distribution, the two-way communication between the server and the terminal is entirely based on encrypted information, and the server can distribute the sensitive content to a plurality of terminals through an open channel. The system for information distribution can realize a security information distribution solution depending solely on a forward open channel, and requires less resources from the plurality of terminals, so it is very suitable for distributing sensitive information such as the firmware of embedded functional modules. This method and system for information distribution can be used in both production environment and the end-user environment of a terminal equipment, and can realize secure online installation, upgrade and update of software or firmware of the terminal equipment in the entire life cycle of the terminal equipment.

BRIEF DESCRIPTION OF THE DRAWINGS

The above and other objectives, advantages and features of the present invention will become more fully understood from the detailed description given hereinbelow in connection with the appended drawings, and wherein.

DETAILED DESCRIPTION OF EMBODIMENTS OF THE DISCLOSURE

Figure 1:
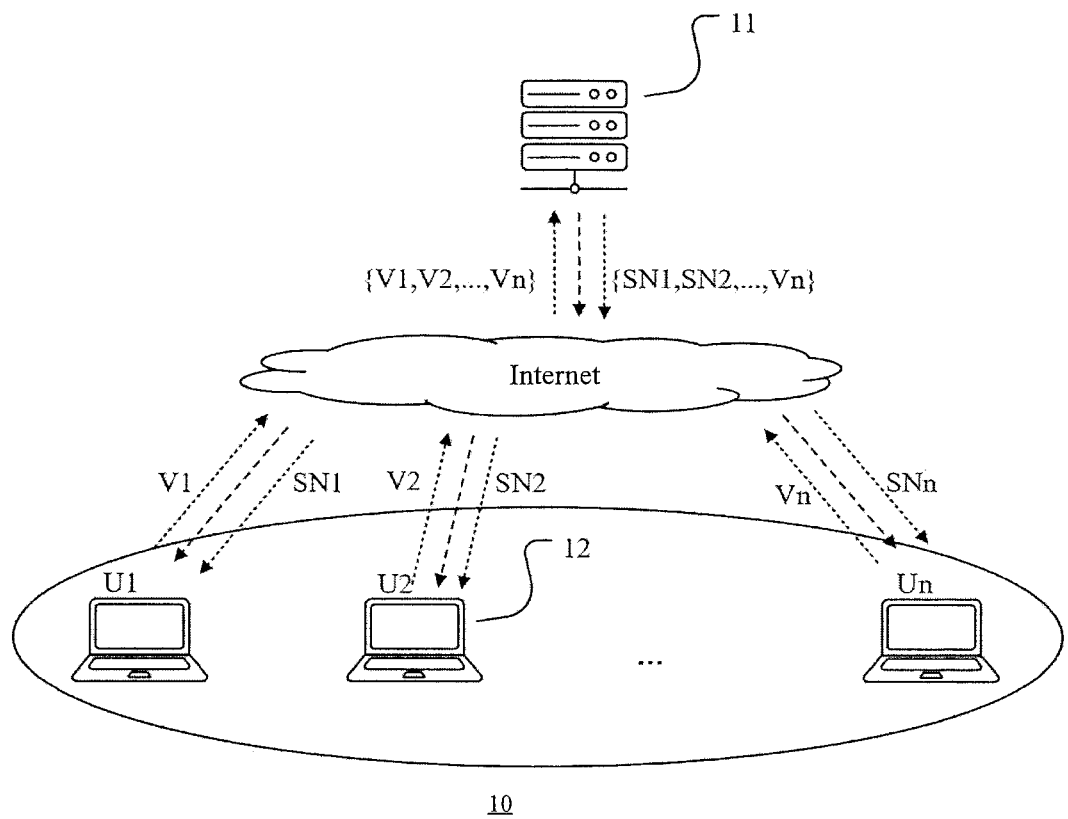
FIG. 1 shows a block diagram of a system for releasing information according to the prior art.

For ease of understanding the present invention, a more complete description of the present invention will be given below with reference to the associated drawings. Preferred embodiments of the present disclosure are given in the drawings. However, the present invention may be implemented in different forms and is not limited to the embodiments described herein. Rather these embodiments are provided for a more thorough understanding of the disclosure of the invention.

In the present disclosure, the term "key-deriving parameter (KDP)" refers to a parameter set which can be published on an open channel and calculated by a server based on an collection of identification information V of group members, a group shared key k, and a random number r. A terminal may perform an inverse operation on the KDP to obtain the group shared key k.

The term "private identifier" means a globally unique identification code within a terminal device, such as an internally generated random code. The private identifier must meet following requirements: 1) it is unique in all devices and there's no duplicate code; 2) it is not allowed to be output or obtained in any other form except the ciphertext which is generated by encrypting the private identifier by the public key of the distribution server provided by manufacturer.

In the present disclosure, {e1, e2, . . . } represents a set of elements, and [e] is used to denote an encrypted value of e.

Unless otherwise defined, all techniques and terms used herein have same meanings generally understood by those skilled in the art of the present disclosure. Terms used in the specification of the present disclosure are for the purpose of describing specific embodiments only and are not intended to limit the present invention.

It should be understood that the steps in the flowchart of the present disclosure are shown sequentially as indicated by the arrows, but these steps are not necessarily performed sequentially in the order indicated by the arrows. Unless explicitly stated in this disclosure, there are no strict sequential restrictions on the execution of these steps, and these steps can be performed in other sequences. Furthermore, at least a portion of the steps in the figure may include a plurality of sub-steps or a plurality of stages, these sub-steps or stages are not necessarily executed at the same time, but may be executed in different phases, and these sub-steps or stages are not necessarily to be sequentially executed, but may be executed in turn or alternately with other steps or at least a part of sub-steps or stages of other steps.

Hereinafter the present disclosure will be described in detail with reference to the accompanying drawings.

Figure 2:
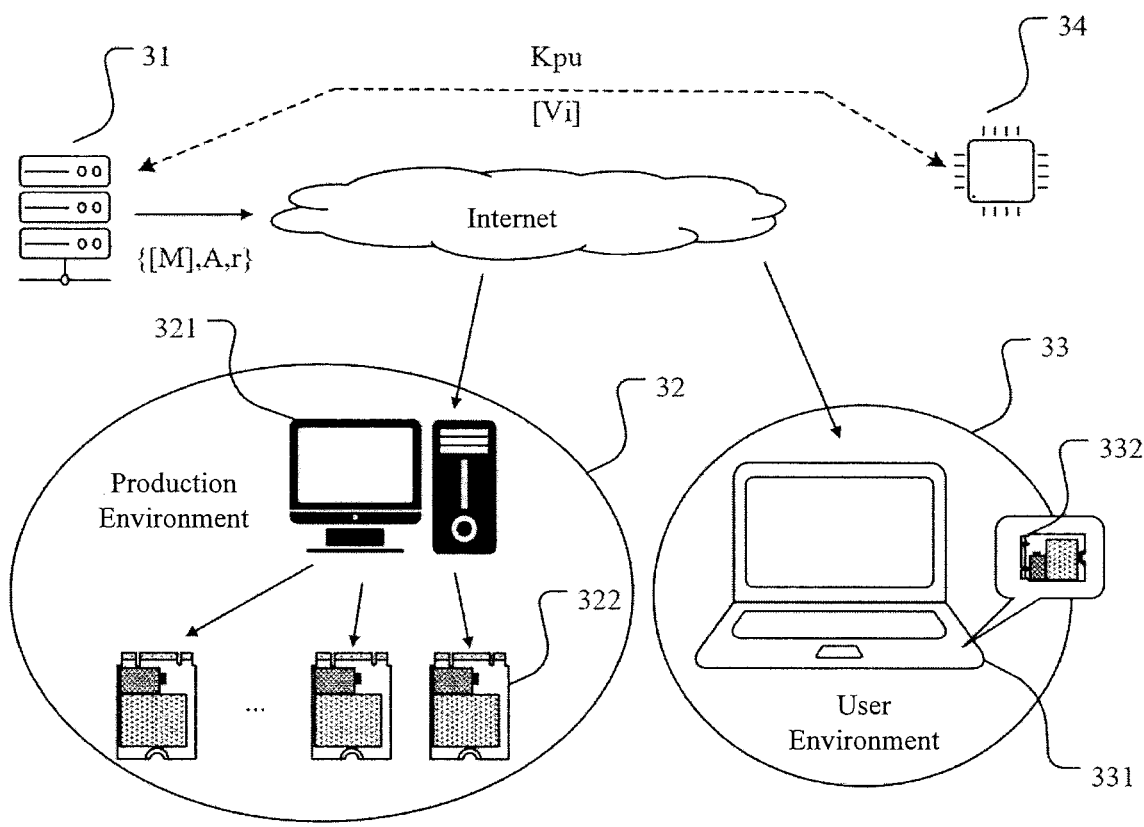
FIG. 2 shows a block diagram of a system for releasing information according to an embodiment of the present disclosure.

FIG. 2 shows a block diagram of a system for information distribution according to an embodiment of the present disclosure.

The system 30 for information distribution comprises a server 31, a first-type terminal 32, a second-type terminal 33, and a master controller chip 34, embedded in a device 322 or 332, to which firmware is going to be distributed. The first-type terminal 32 and the second-type terminal 33 are coupled to the server 31 through an open channel (e.g., the Internet), respectively. The server 31 is used to transmit encrypted sensitive content to the first-type terminal 32 and the second-type terminal 33.

In this embodiment, the system for information distribution is, for example, a firmware distribution system of a solid-state disk (SSD), and the sensitive content transmitted via the open channel is a firmware distribution package of the solid-state disk, so that secure remote distribution, installation and/or update of firmware can be realized. The first-type terminal 32 is, for example, a production environment of solid-state disk, and comprises a production-line control device 321, as the upstream device and a solid-state disk 322 as the target device. The second-type terminal 33 is, for example, an end user computer within which solid-state disk is installed, and comprises a user device (the computer) 331 as the upstream device and an embedded solid-state disk 332 as the target device. Inside the first-type terminal 32 and the second-type terminal 33, the corresponding upstream device and the corresponding target device (SSD) are directly connected electrically by a cable, as the local secure channel.

The solid-state disks 322 and 332 each comprise a master controller chip 34. The master controller chip 34 includes a processor (for example, a system integrated on chip, i.e., SoC) internally for executing data storage management function and cryptographic operation function. The identification information of the solid-state disks 322 and 332 are, for example, private identifiers generated within the master controller chip 34.

The server 31 generates a key pair in accordance with a public key algorithm, the key pair includes a public key Kpu and a private key Kpr and is generated according to a product model or a production batch as needed. The public key Kpu may be provided to the master controller chip 34 or the production line of the solid-state disk in any manner, for example, through an open channel or a secure channel on the Internet, a secure channel on a local area network (LAN), or by use of a USB Flash disk for copying and transferring, or the like. The master controller chip 34 is configured to store the public key Kpu in its internal nonvolatile memory.

On the production line of the master controller chip 34 or in the environment of the first-type terminal 32, the private identifier [Vi], generated inside the master controller and encrypted by the public key Kpu will be collected and delivered in any manner to the distribution server 31 via an open channel or a secure channel.

During the distribution process of a sensitive content M (e.g., an SSD firmware), the server 31 is configured to select a group shared key k and encrypt the sensitive content M with the group shared key k to obtain a ciphertext information [M].

The server 31 generates the Key-Deriving Parameter (KDP) A according to the group shared key k, a set {[Vi]} of the private identifiers [Vi] of the group members and a random code r, and then packages the ciphertext information [M], the key deriving parameter A and the random code r into a distribution package P={[M], A, r}. The first-type terminal 32 and the second-type terminal 33 perform mathematical operation according to the key deriving parameter A and their respective private identifier Vi to obtain the group shared key k, and then decrypt the encrypted information [M] by use of the group shared key k to obtain the sensitive content M.

According to the embodiment, in the system for information distribution, all contents of the two-way communication between the server and the terminals in the firmware distribution process are encrypted information or information that does not need to be kept secret, so that a secure channel for transmitting sensitive content can be directly established to a group on an open channel. In the process of information distribution, the encryption information, the ciphertext of private identifier, the public key, the group shared key and the key deriving parameter of the system for information distribution can be directly transmitted over the open channel, so it is not necessary to provide any one-way or two-way secure channel in advance for exchanging sensitive content between the server and the terminals.

Figure 3:
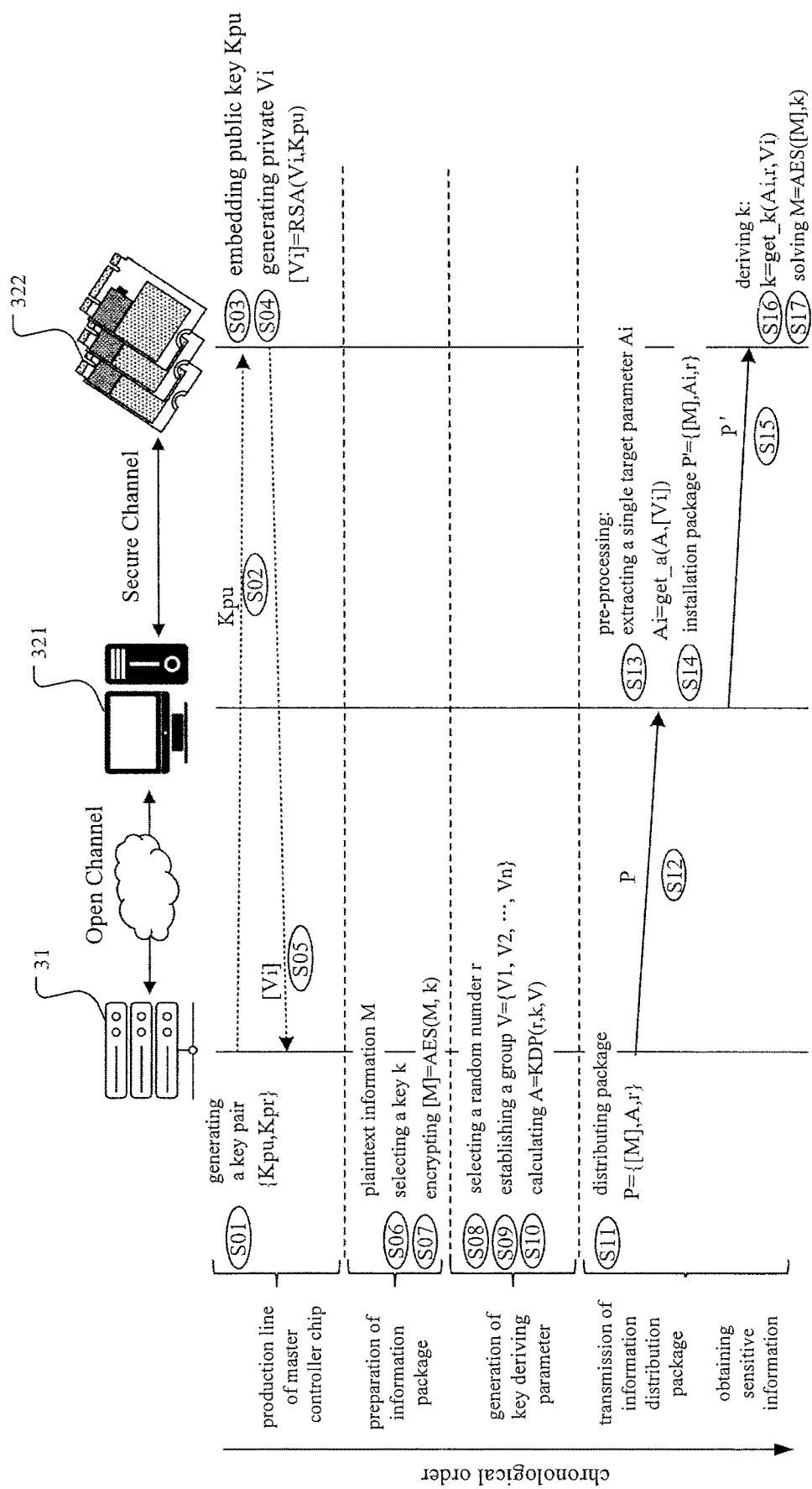
FIG. 3 shows an information flow chart of a system for releasing information according to an embodiment of the present disclosure.

FIG. 3 shows an information flow chart of a method for information distribution according to an embodiment of the present disclosure. The method for information distribution is, for example, executed by the server 31 shown in FIG. 2, to distribute an encrypted firmware to the first-type terminal 32 via an open channel, so that the first-type terminal 32 can safely accept the firmware transmitted over the open channel.

Following operations are executed on the server 31:
1. Selecting the group shared key k and preparing an encrypted information package [M] by use of the group shared key k;
2. Generating the key deriving parameter A corresponding to the group shared key k;
3. Transmitting the distribution package P={[M], A, . . . } to the user equipment 321.

On a production line of the master controller chip 34, the master controller chip 34 can generate, read and write various configuration information during an initialization phase. Following operations are performed on the production line of the master controller chip 34:
4. Burning the public key Kpu provided by the server into the master controller chip 34;
5. By use of the master controller chip 34, generating and encrypting the private identifier [Vi] with Kpu, wherein the private identifier [Vi] is collected by the production line and submitted to the server.

In the production environment of the solid-state disk 322, the solid-state disk 322 includes the master controller chip 34 described above and is coupled to the production-line control platform 321. Following operations are performed in the production environment of the solid-state disk 322:
6. By use of the production-line control device 321, preprocessing the distribution package P, to generate an installation package V corresponding to [Vi];
7. Inputting V to the solid-state disk 322, which is configured to acquire sensitive content M from the installation package V to complete firmware installation or update.

The method for information distribution according to the embodiment will be described in detail below with reference to FIG. 3. A number xx shown in a step number "Sxx" in the following description corresponds to a number in a circle shown in FIG. 3.

In following steps S01 to S05, the master controller chip 34 is configured to submit the private identifier [Vi] to the server.

In step S01, the server 31 is configured to generate a key pair {Kpu, Kpr} based on the public key cryptographic algorithm according to the product model or batch of the master chip, wherein Kpu is the public key and Kpr is the private key. The private key needs to be securely stored on the server 31.

In step S02, the server 31 provides the public key Kpu to the production line of the master controller chip 34 in any manner, for example, via an open channel or a secure channel on the Internet, a secure channel on a local area network, or by use of a USB Flash disk for copying and transferring or the like.

In step S03, the master controller chip 34 is configured to store the public key Kpu in a internal nonvolatile memory.

In step S04, the master controller chip 34 generates the hardware identifier Vi and encrypts the Vi with the public key Kpu embedded in the master controller chip in the step S03 to generate the ciphertext [Vi] of the private identifier. The private identifier Vi is, for example, two 128-bit random numbers.

In step S05, the ciphertext [Vi] of the private identifier is submitted to the server 31. Since the ciphertext [Vi] of the private identifier can only be decrypted by the server 31 using the corresponding private key Kpr, the [Vi] can be transmitted over an open channel. For a plurality of master chips 34, a plurality of private identifiers {[Vi]} may be aggregated and submitted in batches to the server 31.

In an application environment of the solid-state disk, the production-line control device 321 of the first-type terminal 32 is coupled to the server 31 via an open channel, and the production-line control device 321 is coupled to the solid-state disk 322 via a cable. The solid-state disk 322 includes the master controller chip 34.

In following steps S06 to S07, the server 31 is configured to prepare an information package of the encrypted information [M].

In step S06, the server 31 is configured to select the group shared key k based on a symmetric encryption algorithm such as Advanced Encryption Standard (AES) algorithm.

In step S07, the server 31 is configured to encrypt the sensitive content M by use of the group shared key k to obtain the encrypted information [M].

In following steps S08 to S10, the server 31 is configured to generate a key deriving parameter A related to the group shared key k.

The key deriving parameter A may include a set of parameters that can be transmitted over an open channel. The first-type terminal 32 can execute calculation according to the set of parameters to extract the group shared key k.

In step S08, the server 31 is configured to select a random number r.

In step S09, the server 31 is configured to establish a group. The server 31 decrypts the private identifier ciphertext [Vi] submitted by the first-type terminal 32 by use of the corresponding private key to obtain identification information Vi. The identity of each one of the group members is represented by the corresponding identification information Vi. The server 31 is configured to aggregate the identification information Vi of all of the group members into a group membership data set V={Vi}, i=1, 2, . . . , n. Wherein n is the total number of group members. '{ }' denotes a collection of multiple data items.

In step S10, the server 31 is configured to calculate a key deriving parameter A=KDP (r, k, V) of the group shared key k, where KDP represents a transformation function from which the key deriving parameter is derived, V represents an identification information set of the group members, k represents the group shared key, and r represents a random number.

The transformation function KDP is, for example, based on the algorithm described in the fifth embodiment in U.S. Pat. No. 8,848,921B2. After the transformation achieved by using the transformation function KDP, the key deriving parameter A is an n-dimensional vector corresponding to the identification information set V. The vector contains more than two elements including Ai, thus the vector together with the random number r provide sufficient information for the i-th terminal device to calculate the group shared key k.

In another preferred embodiment, the elements in the n-dimensional vector A serving as the key deriving parameter can be algorithmically distributed in a one-dimensional array A' which has more than n elements, and elements in A' unoccupied by elements of A can be filled with random numbers, so as to make it difficult to distinguish effective elements Ai from the filled data, thus further increasing the difficulty for malicious attackers to obtain useful information, so that the security of transmitting A over an open channel can be enhanced.

In following steps S11 to S12, the server 31 is configured to transmit the distribution package to the terminal 32.

In step S11, the server 31 packs the encrypted information [M], the key deriving parameter A, and the random number r into an information distribution package P={[M], A', r}.

In step S12, the server 31 is configured to transmit the information distribution package P to the terminal 32, for example, through an open channel. The production-line control device 321 in the terminal 32 is configured to receive the information distribution package P.

In following steps S13 to S15, the production-line control device 321 performs pre-processing on the distribution package.

In step S13, the production-line control device 321 is configured to extract the element Ai and related information which are corresponding to a certain solid-state disk 322.

The data amount of the information distribution package P is related to the size of the group established by the server 31, and may be beyond the data processing capacity of the solid-state disk 322. However, the amount of data directly related to a certain solid-state disk 322 is very small in the key deriving parameter A', whose capacity is dominant in the information distribution package P.

In this embodiment, the distribution package is preprocessed by the production-line control device 321 in the first-type terminal 32, so that the resource in the production-line control device 321 can be utilized to solve the problem that the solid-state disk 322 is limited in resources. To this end, the production-line control device 321 sends a request to the solid-state disk 322 to obtain the private identifier [Vi], and finds and extracts an element Ai corresponding to the identification information [Vi] of the solid-state disk 322 from the key deriving parameter A' by use of the same algorithm mentioned in step S10, wherein the element Ai serves as a target parameter.

In step S14, the production-line control device 321 packs the above-described encrypted information [M], the element Ai and the random number r into a target installation package P'={[M], Ai, r}.

In step S15, the production-line control device 321 transfers the installation package P' to the solid-state disk 322.

In following steps S16 to S17, the solid-state disk 322 acquires the sensitive content M from the target installation package.

In step S16, the solid-state disk 322 in the first-type terminal 32 is configured to calculate the group shared key k based on the element Ai and the random number r in the installation package V and the identification information Vi of the solid-state disk 322. The calculation process can be expressed as a function: k=get_k (Ai, r, Vi), where get_k ( ) represents the inverse operation function of the aforementioned function KDP. For example, in the example mentioned in step S10, get_k ( ) is used to solve a simple linear combination formula.

In step S17, the solid-state disk 322 in the first-type terminal 32 decrypts the encrypted information [M] in the installation package P' by use of the group shared key k calculated in step S16 to obtain sensitive content M. For example, the plaintext M of the sensitive content can be solved by a symmetric cryptographic algorithm, taking the AES algorithm as an example, M=AES ([M], k).

In this embodiment, sensitive content M obtained by solid-state disk 322 is firmware, thereby local firmware can be installed or updated securely.

In the above-mentioned method for information distribution, according to the algorithm, necessary and sufficient conditions for any terminal, which may include a malicious terminal, to derive the group shared key k are as follows:

The identification information Vi of the target device belongs to the group membership identification code set V, and only when the identification information Vi of the target device is collected in the group membership data set V, the target device has the legal identity of being a member of the group.

The identification information Vi of the target device is associated with the key deriving parameter A, and an element Ai corresponding to the identification information Vi of the target device is included in the key deriving parameter vector A.

Even if the malicious terminal may intercept the information distribution package P={[M], A'} transmitted through an open channel, the malicious terminal can neither obtain the private identifier Vi nor find/extract the element Ai corresponding to the identification information Vi of the target device from the key deriving parameter A'. Therefore, it is unrealistic for the malicious terminal to derive group shared key k. From a cryptographic protection perspective, even if the probability to achieve successful attack is not equal to zero, it is generally recognized to be unrealistic to spend the time and resources required to carry out effective attack.

Compared with conventional solutions, in the method for information distribution according to the above embodiments, the server is not required to generate a member serial number SN, nor required to transmit the member serial number to the target device via a secure channel. Alternatively, the information distribution package P transmitted by the server to the target device only needs to contain the key deriving parameter {Ai} mixed in random codes, and the private identifier of the target device which is not available to the attacker is required for correctly extracting required information from the information including the random codes, all these characteristics can contribute to further improving security.

Assume that the key deriving parameter A is an array of N elements, corresponding to N group members. As a carrier for transmitting A, an array A' containing N/f elements is constructed, where f is less than 1 and serves as a filling factor. All elements of A will be filled into A' based on certain rules. The filling factor f represents a ratio of the number of elements, which are used to store {Ai} in the carrier A' of the key deriving parameter A to the total number of elements included in A'.

Each element of the key deriving parameter A or A' array must be able to accommodate a non-zero element Ai, and an additional field c to store additional information. That is, the array elements of the key deriving parameter A need to be able to store (Ai||c), where '||' represents concatenation. For example, if each non-zero element Ai is a 256-bit data and the additional information is an 8-bit data, each array element of the key deriving parameter A is a 264-bit data.

In a preferred example, a method for filling a non-zero Ai into the carrier A' is as follows: the private identity code [Vi] of the target device uniquely corresponds to a single target device and already exists at both ends of the channel, thus the non-zero Ai can be retrieved according to the value of derived value of the private identity code [Vi].

As an example, a key deriving parameter carrier A' is constructed based on a "Hash table". The Hash table is used to store key-value pairs, so that keywords can be used as indexes to obtain corresponding values. The keyword is represented as idx=H ([Vi], r), where H is a Hash function, [Vi] is a private identifier, and r is a random number. The key-value pairs (idx, Ai) are stored in a Hash table. The Hash table has a "collision" problem, that is, a same keyword idx may be calculated from different identification information Vi of different target devices. There are many ways to solve the collision problem occurred in the technique using Hash table. Because Hash table is a well-known technology, specific solutions for the collision problem are not described in detail here, but can refer to relevant literatures.

It should be noted that collision probability, and the difficulty and the resources required for solving the collision problem are closely related to the filling factor F. The higher the filling factor F is, the less the storage resource is required, but accordingly, the collision probability and the difficulty for solving the collision problem will increase. For example, if the group is likely to have a maximum of 1 million members with a filling factor (filling rate) of 0.5, the carrier A' of the key deriving parameter A needs to provide two million elements. If each element has 264 bits, a 69.2 MB storage space is required to store the key deriving parameter carrier A', and the key deriving parameter carrier array A' needs to be transmitted from the server to the target device or the upstream device of the target device. The storage space and data transfer amount required by the key deriving parameter A' are within a reasonable order of magnitude for the server and the upstream device of the target device.

According to the above embodiments, an information distribution system for firmware distribution is described, where the server is configured to transmit firmware to a plurality of terminals and the target device in the plurality of terminals is configured to install or update or operate the firmware. The target device is, for example, a solid-state disk in the production line, or a solid-state disk within a computer. However, applications of the present invention are not limited to this. For example, the target device may include a computer or any embedded functional module with processor capabilities. The embedded functional module may include any one of a solid-state disk, a camera module, a display driver chip and a touch driver chip. For example, in a system for information distribution, sensitive content transmitted from a server to a plurality of terminals includes any one of software, firmware, webpage content, and data interaction information.

It should be noted that, in the description of the present disclosure, it should be understood that the terms "up", "down", "inside" and the like denote an orientation or positional relationship for ease of description and simplification of description only, and are not intended to indicate or imply that the referred component or element must have a particular orientation, be constructed and operate in a particular orientation, and therefore cannot be construed as limiting to the invention.

In addition, in the present disclosure, the terms "comprise", "comprising" and the like are used to refer to comprise in nonexclusive sense, so that any process, approach, article or apparatus relevant to an element, if follows the terms, means that not only said element listed here, but also those elements not listed explicitly, or those elements inherently included by the process, approach, article or apparatus relevant to said element. If there is no explicit limitation, the wording "comprise a/an . . ." does not exclude the fact that other elements can also be included together with the process, approach, article or apparatus relevant to the element.

Finally, it should be understood that although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. There is no need and cannot be an exhaustive list of all embodiments herein. The invention is intended to cover alternatives, modifications and equivalents that may be included within the spirit and scope of the invention as defined by the appended claims.

What is claimed is:

1. A system for secure information distribution, comprising:
   a server for generating a key pair which includes a public key and a private key and is required by a public key cryptographic algorithm, generating a group shared key and a key deriving parameter corresponding to the group shared key, wherein the server is configured to encrypt a package of sensitive content by use of the group shared key to obtain a package of encrypted information; and
   a plurality of terminals, configured to receive the encrypted information broadcasted by the server through an open channel, decrypt the encrypted information by use of the group shared key to obtain the sensitive content, wherein, each of the plurality of terminals is configured to encrypt its private identifier which is global unique by use of the public key, to generate a ciphertext of the private identifier, wherein, the server is configured to generate the key deriving parameter by executing following steps:

collecting the private identifiers of the plurality of terminals;

constructing a group according to the collection of private identifiers submitted by the plurality of terminals; and calculating the key deriving parameter according to the group shared key, an additional parameter and said collection of private identifiers of the plurality of terminals, wherein each one of the plurality of terminals is configured to obtain the group shared key by executing the following step:

performing an inverse operation in accordance with the key deriving parameter, the additional parameter and the private identifier of the corresponding one of the plurality of terminals, to obtain the group shared key.

2. The system according to claim 1, wherein the server is configured to transmit the encrypted information to the plurality of terminals through the open channel or a secure channel.

3. The system according to claim 1, wherein the public key is embedded in the plurality of terminals.

4. The system according to claim 1, wherein the plurality of terminals each comprise:

an upstream device, coupled with the server through the open channel; and a target device, configured to communicate with the upstream device through a secure channel, wherein the private identifier of the target device serves as an identification information of a corresponding one of the plurality of terminals, wherein, the target device is configured to execute the inverse operation to solve the group shared key out.

5. The system according to claim 4, wherein the upstream device is a production-line control device, and the target device is a functional module under production.

6. The system according to claim 4, wherein the upstream device is a user computer and the target device is an embedded functional module.

7. The system according to claim 6, wherein the embedded functional module comprises a processor for processing the sensitive content.

8. The system according to claim 6, wherein the embedded functional module comprises any one of a solid-state disk, a camera module, a display driver chip and a touch driver chip.

9. The system according to claim 6, wherein the embedded functional module comprises a master controller chip, and the private identifier serving as the identification information of the corresponding one of the plurality of terminals is generated and stored inside the master controller chip.

10. The system according to claim 6, wherein the sensitive content includes any one of a software, a firmware, a webpage content, and a data interaction information.

11. The system according to claim 1, wherein after calculating the key deriving parameter, the server is further configured to execute following steps:

establishing a Hash table which has a capacity larger than a capacity required for storing the key deriving parameter of the plurality of terminals;

storing a plurality of key-value pairs in the Hash table, wherein keywords in the plurality of key-value pairs respectively correspond to indexes of the key deriving parameter, and values in the plurality of key-value pairs respectively correspond to elements of the key deriving parameter; and filling an unoccupied element in the Hash table with a random number.

12. The system according to claim 11, wherein the indexes are computed based on the private identifiers of the plurality of terminals.

13. A method for information distribution, comprising:

executing following steps on a server:

generating a key pair which is required by a public key cryptographic algorithm and includes a public key and a private key;

collecting private identifiers encrypted by said public key of a plurality of terminals;

constructing a group according to the private identifiers submitted by the plurality of terminals;

generating a group shared key;

calculating a key deriving parameter according to the group shared key, an additional parameter and the private identifiers of the plurality of terminals;

encrypting a package of sensitive content by use of the group shared key to obtain a package of encrypted information; and packaging the encrypted information, the key deriving parameter and the additional parameter together into a package and distributing the package, executing following steps on each one of the plurality of terminals:

encrypting the private identifier which is global unique and associated with a corresponding one of the plurality of terminals by use of the public key to generate a ciphertext of the private identifier;

receiving the encrypted information and the key deriving parameter distributed by the server via an open channel;

performing an inverse operation according to the key deriving parameter, the additional parameter and the private identifier associated with the corresponding one of the plurality of terminals to obtain the group shared key; and decrypting the encrypted information by use of the group shared key to obtain the sensitive content.

14. The method according to claim 13, wherein the server is configured to transmit the encrypted information to the plurality of terminals via an open channel or a secure channel.

15. The method according to claim 13, wherein the public key is embedded in the plurality of terminals.

16. The method according to claim 13, wherein the plurality of terminals each comprise:

an upstream device coupled with the server via the open channel; and a target device communicating with the upstream device via a secure channel, wherein the identification information of each one of the plurality of terminals is the private identifier of the corresponding target device, wherein, the target device is configured to execute the inverse operation to solve the group shared key out.

17. The method according to claim 16, wherein the upstream device is a module controller of a production line, and the target device is a functional module in production; or the upstream device is a user computer and the target device is an embedded functional module.

18. The method according to claim 13, wherein the sensitive content includes any one of a software, a firmware, a webpage content and a data interaction information.

19. The method according to claim 18, wherein after calculating the key deriving parameter, the server is further configured to execute following steps:
- establishing a Hash table which has a capacity larger than a capacity required for storing the key deriving parameter of the plurality of terminals;
- storing a plurality of key-value pairs in the Hash table, wherein keywords in the plurality of key-value pairs respectively correspond to indexes of the key deriving parameter, and values in the plurality of key-value pairs respectively correspond to elements of the key deriving parameter; and
- filling an unoccupied element in the Hash table with a random number.

20. The method according to claim 18, wherein the indexes are computed based on the private identifiers of the plurality of terminals.

* * * * *